United States Patent [19]
Kensler, Jr. et al.

[11] 3,931,412
[45] Jan. 6, 1976

[54] FUNGUS AND BACTERIA CONTROL WITH DI-CARBOXYLIC ACID ESTERS

[75] Inventors: Daniel L. Kensler, Jr., West Des Moines, Iowa; Gustave K. Kohn, Berkeley, Calif.; David D. Walgenbach, Brookings, S. Dak.

[73] Assignee: Chevron Research Company, San Francisco, Calif.

[22] Filed: May 9, 1974

[21] Appl. No.: 468,629

Related U.S. Application Data

[63] Continuation-in-part of Ser. No. 266,945, June 28, 1972, abandoned, which is a continuation-in-part of Ser. No. 71,364, Sept. 11, 1970, abandoned, which is a continuation-in-part of Ser. No. 871,940, Oct. 28, 1969, abandoned.

[52] U.S. Cl. .............. 424/313; 424/311; 260/488 J; 260/486 R
[51] Int. Cl.$^2$ .......................................... A01N 9/24
[58] Field of Search ..................... 424/311, 313, 317

[56] References Cited
UNITED STATES PATENTS 3,219,630  11/1965  Sidi ....................... 260/67
3,336,262  8/1967  Sidi ....................... 260/67
3,608,085  9/1971  Papworth .............. 424/317

FOREIGN PATENTS OR APPLICATIONS 881,102   11/1961  United Kingdom
1,036,344  7/1966  United Kingdom Primary Examiner—V. D. Turner
Attorney, Agent, or Firm—G. F. Magdeburger; John Stoner, Jr.; Raymond Owyang

[57] ABSTRACT

Fungal and bacterial growth are inhibited by the use of di-carboxylic acid esters and compositions thereof. In a preferred embodiment, crops and animal feedstuffs are preserved during storage against fungal attack by applying a fungicidal amount of a mono-, di- or trioxymethylene, or lower alkylidene bis-alkanoate, or a mixture thereof. In another preferred embodiment, apple scab is controlled by applying to apple trees a fungicidal amount of a mono-, di- or trioxymethylene bis-alkanoate.

29 Claims, No Drawings

FUNGUS AND BACTERIA CONTROL WITH DI-CARBOXYLIC ACID ESTERS

CROSS-REFERENCE TO RELATED APPLICATIONS

This application is a continuation-in-part of application Ser. No. 266,945, filed June 28, 1972, now abandoned, which in turn is a continuation-in-part of Ser. No. 71,364, filed Sept. 11, 1970, now abandoned, which in turn is a continuation-in-part of application Ser. No. 871,940, filed Oct. 28, 1969, now abandoned, the disclosures of which are incorporated by reference.

BACKGROUND OF THE INVENTION

British Patent No. 1,155,485 of BP Chemicals, published June 18, 1969, discloses the use of propionic acid for the inhibition of fungus and mold growth in crops and animal feedstuffs. U.S. Pat. No. 3,595,665, issued July 27, 1971, to J. J. Houltson et al, discloses the use of formic, acetic and propionic acid mixtures for the inhibition of mold growth in crops and animal feedstuffs. U.S. Pat. No. 1,670,980, issued May 22, 1928, to G. Osvald, discloses the use of formaldehyde for protecting seeds from fungal attack. U.S. Pat. No. 861,571, issued July 30, 1907, to H. S. Blackmore, discloses the use of a formaldehyde-methyl acetate solution for germicidal purposes.

DESCRIPTION OF THE INVENTION

The Di-Esters

The pesticidal di-esters of the present invention are represented by the formula

$$RCO(CHO)_nCR^2 \quad (I)$$

wherein R is alkyl of 1 to 6 carbon atoms or alkenyl of 2 to 6 carbon atoms or alkenyl of 2 to 6 carbon atoms, $R^2$ is alkyl of 1 to 6 carbon atoms, $R^1$ is hydrogen, alkyl of 1 to 6 carbon atoms, chloroalkyl of 1 to 4 carbon atoms and 1 to 5 chloro groups, alkenyl of 2 to 6 carbon atoms, phenyl or alkylphenyl of 7 to 10 carbon atoms, and $n$ is 1, 2 or 3.

Representative alkyl groups which R, $R^1$ and $R^2$ may represent include methyl, ethyl, n-propyl, isopropyl, n-butyl, isobutyl, n-pentyl, 2-methylbutyl, hexyl and isohexyl.

Representative alkenyl groups which R, $R^1$ and $R^2$ may represent include vinyl, allyl, 2-butenyl, 4-butenyl and 3-hexenyl.

Representative alkylphenyl $R^1$ groups are o-tolyl, p-tolyl, xylyl, 2,4,6-trimethylphenyl, 2,4-diethylphenyl and 4-t-butylphenyl.

Representative chloroalkyl $R^1$ groups are chloromethyl, dichloromethyl, trichloromethyl, pentachloroethyl, 3-chloropropyl and 2-chlorobutyl.

R and $R^2$ are preferably alkyl of 1 to 3 carbon atoms. More preferably, R and $R^2$ are the same alkyl group.

$R^1$ is preferably hydrogen or alkyl of 1 to 3 carbon atoms, especially methyl.

Representative di-esters and bis-esters of Formula (I) are illustrated in Table I, wherein R, $R^1$, $R^2$ and $n$ have the same significance as previously defined. As employed herein, the term "di-ester" refers to symmetrical or asymmetrical esters of Formula (I), and the term "bis-ester" refers to symmetrical esters of Formula (I) (R and $R^2$ are the same).

The di-esters of the invention are suitably employed alone or as a mixture of several different di-esters.

The preferred di-esters of the invention are mono-, di- or trioxymethylene bis-alkanoates [i.e., bis-esters of Formula (I) wherein R and $R^2$ are the same alkyl, $R^1$ is hydrogen and $n$ is 1, 2 or 3].

Preparation of the Di-Esters

The di-esters can be prepared by the reaction of a carboxylic acid anhydride and formaldehyde or aldehyde according to the following Equation (1)

$$nR^1CHO + RCOCR^2 \longrightarrow RCO(CHO)_nCR^2 \quad (1)$$

wherein R, $R^1$, $R^2$ and $n$ have the same significance as previously defined.

Generally, stoichiometric amounts of the aldehyde and anhydride are used. Polymers of the aldehydes, e.g., trioxane, that depolymerize under reaction conditions are convenient sources of the same aldehydes. The reaction is catalyzed with Lewis acids such as boron trifluoride or strong inorganic acids such as sulfuric or phosphoric acid. Reaction temperatures range from 50° to 150°C., preferably from 75° to 125°C. Generally, a mixture of products wherein $n$ is 1, 2 and 3 is formed in the reaction. The mixture products can be employed in the method of the invention without separation. Alternatively, the mixture can be separated by fractional distillation.

The preparation of alkylidene bis-alkanoates according to Equation (1) is disclosed by E. H. Man, J. J. Sanderson and C. R. Hauser, "J. Amer. Chem. Soc." 70, 847 (1950), and the preparation of oxymethylene bis-acetate according to Equation (1) is disclosed by C. J. Tomiska and E. Spousta, "Chem. Comm." 211 (1962).

The preparation of methylene dialkanoate is also disclosed in British Patent No. 1,036,344, published July 20, 1966; U.S. Pat. No. 3,219,630, issued Nov. 23, 1965 to H. Sidi, and U.S. Pat. No. 3,336,262, issued Aug. 15, 1967, to H. Sidi.

Utility

The di-esters of the invention are useful for controlling fungi, such as molds, mildews and yeasts, and bacteria. The di-esters are particularly effective for the control of seed- and soil-borne fungi such as Rhizopus species, Penicillium species, Fusarium species and Aspergillus species, fungal scab such as *Venturia inaequalis*, and bacterial blight such as *Erwinia amylovora*.

In the control of fungi or bacteria, the di-esters are applied in fungicidally effective amounts by conventional art methods to the fungi or bacteria and/or their habitats.

The di-esters are particularly effective for inhibiting fungal growth in organic matter such as crops and animal feedstuffs. The term "crops" as used in the present invention is intended to include any substance grown from the soil, either in the form as gathered from the field or after suitable modification in form, such as by pressing, grinding or pressing into a paste, flour, etc., or as by germinating into a seedling, e.g., bean sprouts. Thus, the term "crops" refers to forage crops such as alfalfa, clover, hay, fodder, etc.; seeds such as cereal grains, e.g., flax, corn, wheat, oats, rice, barley, rye; legumes, e.g., soybeans, peas, black beans; nut seeds, e.g., peanuts, walnuts, pecans, sunflower seeds, almonds, chestnuts, hazel nuts. Additional crops include silage, green wood such as lumber, wood chips, wood pulp; lawn grass clippings; vegetable crop residue feeds such as carrot greens; tubers and roots of plants such as potatoes, beets, yams, etc.; flower bulbs such as tulip bulbs, daffodil bulbs, etc.; dried fruits such as dates, apricots, figs, etc.; crop by-products such as citrus pulp and pomace, apple pomace, beet pulp, almond hulls, etc.

The di-esters are also particularly useful for the control of fungal growth on plants and other vegetative hosts, particularly the scab diseases of apples and numerous other species of the genus Malus, and plants of genera closely related to Malus, such as Pyrus and Crataegus, caused by the parasitic fungus *Venturia inaequalis* and related fungal species.

A valuable characteristic of the di-esters is their ability to kill or eradicate scab fungus infection already established within a plant; i.e., they are curative. Thus, the di-esters need not be applied until after conditions develop which permit the actual initiation of fungus attacks. This means that, under some circumstances, it is possible to avoid applying any pesticide during the entire season. In other cases, only a part of the normal full schedule of pesticide is required. Therefore, great savings both in chemical cost and application labor are possible with a pesticide capable of curative performance.

In addition to inhibiting the growth of fungi and molds, the bis-esters, particularly bis-alkanoates, employed in the method of the invention generally do not leave toxic or potentially toxic residues on the crop or animal feedstuff treated, are essentially non-corrosive to metals, have nutritional value as food supplements, and preserve and/or increase the nutritional value of the crop or animal feedstuff treated.

In addition to vegetative hosts and vegetative products such as crops, the di-esters are broadly applicable for inhibiting fungal growth in any organic material susceptible to attack by soil- and seed-borne fungi. For example, the di-esters are useful for inhibiting fungal growth in organic materials of animal origin such as leathers, wool, etc., and non-vegetative animal feedstuffs such as fish meal, meat meal, bone meal, dried blood, etc.

The di-ester compounds used in this invention are normally liquid and may be conveniently applied neat with liquid sprayers and dispersers to the fungi or bacteria and/or their growth environment. If desired the di-ester compounds may be applied with biologically inert solvents in amounts from about 0.05 to 95 percent weight, based on weight solvent, to facilitate their uniform application to the substance being treated. Examples of solid carriers are clay, talc, sawdust, and the like. Examples of suitable liquid organic solvents include aromatic hydrocarbons such as benzene, toluene; lower alkyl ketones such as acetone and methylethylketone; petroleum fractions; alcohols (especially lower-molecular-weight alcohols); and chlorinated aliphatic hydrocarbons such as methylene chloride. The lower di-esters are generally water-miscible so that water is a convenient solvent for these di-esters. Mixtures of water and organic solvents may also be used for the di-esters.

In the preservation of crops such as cereal grains and seeds during storage, amounts of bis-ester ranging from 2 to 20 weight ounces per bushel are generally suitable. The dosages defined above are also sufficient to preserve and promote the nutritional value of edible feedstuffs such as crops and animal feedstuffs.

To prevent foliage phytotoxicity to plants and vegetative hosts subject to fungal or bacterial attack, the di-esters are most conveniently applied to plants and other vegetative hosts in the form of an aqueous solution. The aqueous solution preferably contains from about 0.1 to 10 percent by weight, more preferably about 0.5 to 5 percent by weight, of the di-ester. The activity of the aqueous formulation of the diesters can be enhanced by incorporating minor amounts, e.g., 0.01 to 5 percent by weight, of one or more surface-active agents, sometimes called "surfactants," "wetting agents" or "dispersing agents."

In addition to the liquid solvent formulations, the di-esters may also be combined with other compounds such as dispersing agents, adjuvants, food additives and other pesticides. The di-esters are particularly useful in combination with other compounds because of the ability of the di-esters to dissolve a variety of types of compounds.

A useful combination comprises the di-esters and fungal growth inhibitors such as lower alkanoic acids of 1 to 5 carbon atoms or solutions of alkanoic acids and formaldhyde. Inhibition of fungal growth in crops with alkanoic acids is disclosed in U.S. Pat. No. 3,595,665, issued July 27, 1971, and British Patent No. 1,155,485, issued June 18, 1969.

In the treatment of crops and foodstuffs used for animal and human consumption, the di-esters are suitably employed in combination with an anti-oxidant. The combination of the di-esters and the anti-oxidant is particularly useful for conserving the palatability and nutritional values of foods. Examples of suitable anti-oxidants which can be combined with the oxyalkylene compound include hindered or partially hindered phenols such as p-hydroxybenzoic acid methyl ester, 2,6-(di-t-butyl)-p-cresol, 3-t-butyl-4-hydroxyanisole, 2-t-butyl-4-hydroxyanisole, 2,2'-methylene-bis-4-methyl-6-t-butylphenol, etc.; dialkyl thiodipropionates such as dilauryl thiodipropionate and distearyl thiodipropionate; amine anti-oxidants such as diphenylamine, N,N'-di-sec-butyl-1,4-phenylenediamine, phenothiazole, etc. Anti-oxidants such as 2,6-(di-t-butyl)-p-cresol, which are approved for use on foodstuffs or in packaging of foodstuffs, are preferred for this application.

The weight of di-ester to anti-oxidant can be varied over wide limits. Generally, however, the percent weight of di-ester, based on total composition, of from about 5 to 95 percent, and percent weight of anti-oxidant, based on total composition, of from about 5 to 95 percent, are satisfactory.

In the treatment of scab diseases of apple trees, a particularly useful combination is a formulation of the di-ester and a protective scab fungicide. Such a combination would have the ability to stop the progress of fungal infection that has already begun and protect against future infection periods. Suitable protective fungicides include methyl isothiocyanate, cis-N-(trichloromethylthio)-4-cyclohexene-1,2-dicarboximide (Captan), cis-N-(1,1,2,2-tetrachloroethylthio)-4-cyclohexene-1,2-dicarboximide (Captafol), N-(trichloromethylthio)phthalimide (Folpet), 2-methyl-4,6-dinitrophenol sodium salt, 4,6-dinitro-2-sec-butylphenol triethanolamine salt, methyl 1-butylcarbamoyl)-2-benzimidazole carbamate (Benomyl), and dodecylguanidine acetate, Another useful combination comprises liquid formulations of the di-esters and other pesticides. The di-alkanoates are particularly useful in such formulations because of the ability of the di-alkanoates to rapidly penetrate organic matter and the solvent properties of the di-alkanoates for various pesticides. For example, a combination of a di-alkanoate and an insecticide provide penetrability, insecticidal action and fungicidal action in the same formulation. Such a formulation would be particularly useful for termite and rot control of wood products, e.g, lumber.

EXAMPLES

The following examples illustrate the compounds and/or compositions and methods of this invention. The examples are intended to illustrate the invention and are not considered restrictive of the invention as otherwise described herein. Indicated ratios and percentages are by weight unless otherwise specified.

Example 1 — Preparation of Methylene Bispropionate 6 g of paraformaldehyde (0.2 mol of formaldehyde) and 26 g (0.2 mol) of propionic anhydride were mixed in a vessel to which one drop of H2SO4 was added. The tube was sealed and heated at 100°C. for 18 hours.

In a companion preparation, 21 g of paraformaldehyde (0.7 mol of formaldehyde) and 91.0 g (0.7 mol) of propionic anhydride were mixed in a reaction flask to which one drop of H2SO4 was added. The mixture was refluxed for 2 hours.

The two mixtures were combined and fractionated. The first fraction, 93 g, boiled at 90° to 95°C. at 25 mm pressure. The second fraction, 22 g, boiled at 130°C. at 25 mm pressure. The product of the first fraction was identified by nuclear magnetic resonance (NMR) as methylene bispropionate. The product of the second fraction was identified by NMR as oxybismethylene bispropionate.

Example 2 — Preparation of Oxybismethylene Bispropionate 44.5 g of paraformaldehyde (1.5 mol of formaldehyde) and 200.0 g (1.25 mol) of oxymethylene bispropionate were mixed in a vessel to which one drop of H2SO4 was added. The vessel was sealed and heated at 100°C. for 72 hours. Fractionation of the product gave oxybismethylene bispropionate (ca. 50 percent) having a boiling point of 85.5°C. at 1 mm pressure and bisoxymethylene bispropionate (ca. 15 percent) having a boiling point of 98°C. at 1 mm pressure.

Example 3 — Preparation of Methylene Bisacetate and Oxybismethylene Bisacetate 20.4 g of acetic anhydride (0.2 mol), 6.0 g of paraformaldehyde (0.2 mol of formaldehyde) and 2 drops of sulfuric acid were heated at 100°C. in a sealed tube for 18 hours. Fractionation of the product gave methylene bisacetate and oxybismethylene acetate.

Example 4 — Preparation of Methylene Bisisobutyrate and Oxybismethylene Bisisobutyrate A 30-g (0.33 mol) sample of trioxane was added to a solution of 158 g (1 mol) isobutyric anhydride and 0.5 ml 70 percent perchloric acid over a 30-minute period at 65°–70°C. The reaction mixture was then stirred until the temperature decreased to 27°C. The reaction mixture was diluted with saturated sodium bicarbonate solution and extracted with ether. The ether extracts were dried over magnesium sulfate and evaporated under reduced pressure. The resulting residue was distilled on a 30-cm column to give 112 g of methylene bisisobutyrate, b.p. 43°–48°C. at 0.2–0.3 mm of Hg and 30 g of oxybismethylene isobutyrate, b.p. 57°–63°C. at 0.2–0.3 mm of Hg.

Example 5 — Preparation of Methylene Bisbutyrate and Oxybismethylene Bisbutyrate Trioxane (0.33 mol) and butyric anhydride (1 mol) were reacted using perchloric acid as catalyst by the procedure employed in Example 4. The resulting methylene bisbutyrate product (82 g) distilled at 55°–58°C (0.02 mm/Hg) and the resulting oxybismethylene bisbutyrate product (33 g) distilled at 65°–68°C. (0.02 mm/Hg).

Example 6 — Preparation of Benzylidene Bispropionate

Benzaldehyde (1.5 mol) and propionic anhydride (1.5 mol) were reacted in the presence of 0.5 ml perchloric acid by the procedure of Example 4. The resulting benzylidene bispropionate distilled at 104°C. (0.1 mm/Hg).

Example 7 — Preparation of Ethylidene Bispropionate

An 88-g (2 mols) sample of acetaldehyde was added in small portions to a solution of 260 g (2 mols) of propionic anhydride at 60°C. The reaction mixture was then stirred at about 25°C for 7 hours. The reaction mixture was diluted with saturated sodium bicarbonate solution and extracted with methylene dichloride. The methylene dichloride extracts were dried over magnesium sulfate and evaporated under reduced pressure. The resulting residue was distilled through a 16-inch column to give 316.5 g of ethylidene bispropionate, b.p. 57°C. (1 mm/Hg).

Example 8 — Preparation of 2,2,2-Trichloroethylidene Bispropionate

Trichloroacetaldehyde (0.2 mol) and propionic anhydride (0.2 mol) were reacted in the presence of 0.2 ml 70 percent perchloric acid by the procedure of Example 4. The resulting 2,2,2-trichloroethylidene bispropionate product (13 g) distilled at 65°–66°C. (0.1 mm/Hg). Elemental analysis for C8H11Cl3O4 showed: %Cl, calc. 38.3, found 38.1.

Example 9 — Preparation of Allylidene Bispropionate

To a solution of 345 g (2.65 mols) propionic anhydride and 1.05 g concentrated sulfuric acid maintained at 45°–50°C. was added dropwise 140 g (2.5 mols) acrolein over a period of 15 minutes. The reaction mixture was stirred for an additional 10 minutes. A 2.6 g-sample of 2,4,6-trimethylpyridine was then added and the reaction mixture stirred at about 25°C. for about 17 hours. The reaction mixture was then distilled through a short column to give 268 g of the product as a slightly yellow liquid, b.p. 96°–101°C. (0.25 mm Hg).

Example 10 — Preservation of Grain

High-moisture corn (25 percent moisture) was treated with various methylene and polyoxymethylene esters of propionic or acetic acid of various dosages. The esters were applied to the corn in a mixer for 1 minute at 32 rpm. Three identical 2-gallon ventilated cans were filled with the treated corn. The cans were then held at a temperature of 70°–72°F. Temperature readings were taken semi-weekly by means of thermocouples in the center of each can. When the temperature exceeded constant room temperature for at least an 8-hour period, the treatment was considered broken.

Visual observations were also made on the amount of corrosion damage to the can (due principally to moisture condensation). This damage was rated on a 1-to-10 basis, 1 indicating no corrosion and 10 indicating heavy corrosion. The results of these tests are tabulated in Table II.

As can be seen from Table II, the compounds of the present invention were at least as effective as propionic acid in the treatment of high-moisture corn. Methylene bispropionate and oxybismethylene propionate were remarkably superior to propionic acid in the preservation of high-moisture corn. Further, while the acetates were effective preservatives, it is noted that the propionates are far superior to the acetates. Oxybismethylene bispropionate is far less corrosive than propionic acid, which is a very desirable characteristic. Furthermore, visual observation of the color of the thus-treated corn indicated that the corn treated with the compounds of the present invention had better color characteristics than the corn treated with propionic acid. The propionic-acid-treated corn was off-color, that is, either light or dark.

Example 11 — Preservation of Grain

A mixture of propionic acid (99 percent) and aqueous formaldehyde (37 percent) was applied to corn (25 percent moisture) at various dosages. These mixtures were applied to the corn in a mixer for one minute at 32 rpm. Three 7-inch ventilated cans (equal to ⅓ bushel) were filled with this treated corn. The cans were then held at 68°–73°F. Temperature readings were taken semi-weekly in the center of each can. When the temperature exceeded constant room temperature for at least an 8-hour period, the treatment was considered broken. The corn was also visually observed for microbe growth semi-weekly, and the observations were translated into a growth rating on a 1–10 basis, 1 indicating no growth and 10 indicating heavy, uniform growth.

For comparative purposes, corn treated with a commercial fungicide, sodium N-methyldithio carbonate, at a dosage known to give effective preservation of corn under field conditions, was included in the test. For similar reasons, corn treated only with propionic acid or aqueous formaldehyde were also included.

The results of the above-mentioned tests, expressed as the average of the three identical cans, are reported in Table III.

Example 12 — Preservation of Wood Chips and Various other Agricultural Crops Methylene bispropionate was applied to a variety of crops at various dosages by spraying or in a mixer. Two ventilated cans were filled with each treated crop. The cans were then maintained at 70°F. ±5°F. Each can was periodically visually observed for fungal growth and the observations were translated into a growth rating on a 1-to-10 basis, 1 indicating no growth and 10 indicating heavy, uniform growth. For comparison, two samples of each untreated crop were also tested. The crops employed, the percent weight methylene bispropionate (MBP) based on weight crop, and the fungal rating 2, 7–8 and 28–29 days after treatment are tabulated in Table IV.

Example 13 Differential Fungal Control of Treated Corn by Various Di-Esters

A variety of bis-esters was tested for the control of seed- and soil-borne pathogens during storage of corn seeds (*Zea mays*) by the following procedure.

A small amount of acetone was added to the bis-ester to make specific volume, plus a small portion of emulsifier, making it into a slurry. This preparation was diluted with water to the desired concentration. The solution was then evenly distributed on the wall of a glass jar. High-moisture feed corn with natural infection was stored frozen after harvest until used for this test. The corn seeds were rolled in the jar until they were coated and the solution was completely absorbed on them.

Following the treatment, the corn seeds were plated on Potato Dextrose Agar plates. For comparison, untreated corn seeds were also plated. Propionic acid was also tested for comparison.

The percentage control of all species was based on the total sum average of mycelial growth in millimeters of all species in the treated seeds relative to the untreated check. The fast-growing Rhizopus was evaluated 7 days after treatment, the other fungi after 14 days.

The bis-ester tested, the concentration of active ingredient (ounces/100 lbs. of seeds), the average mycelial growth in millimeters each pathogen (average of 4 tests), sum of the averages of all species and the percent control are tabulated in Table V.

Example 14 — Differential Fungal Control of Treated Corn by Various Di-esters A variety of bis-esters was tested for the control of seed- and soil-borne pathogens during the storage of corn seeds (*Zea mays*) by the procedure of Example 11. For comparison, propionic acid was also tested.

Control of each pathogen was determined by mycelial growth in millimeters in the treated seeds relative to untreated seeds. Mycelial growth of Rhizopus species and Fusarium species was evaluated 5 days after treatment. Mycelial growth in *Aspergillus niger* was evaluated 14 days after treatment.

The bis-ester tested and the concentration of active ingredient in ounces per 100 lbs. of corn seeds for 90 percent control of each pathogen species are tabulated in Table VI.

Example 15 — Acute Oral Toxicity of Methylene Bispropionate

Methylene bispropionate was subjected to acute oral toxicity studies using white rats. This compound was found to have an LD-50 of 2800 mg/kg body weight of white rats.

Example 16 — Use of Methylene Bispropionate as a Solvent

Methylene bispropionate was tested as a solvent for various insecticides. S-[1,2-bis(ethoxycarbonyl)ethyl]-O,O-dimethyl phosphorodithioate (Malathion) and O,O-diethyl-O-p-nitrophenyl phosphorothioate (Parathion) was miscible with methylene bispropionate in all proportions. O,S-dimethyl N-acetyl phosphoroamidothioate was soluble in methylene bispropionate to the extent of 5 percent by weight. Chlordane was soluble in methylene bispropionate to the extent of at least 75 percent by weight.

Example 17 — In Vitro Control of Fungi and Bacteria

Microbiological tests were conducted to determine the antimicrobial activity of methylene bispropionate (MBP).

The minimum concentration of MBP capable of inhibiting the growth of 5 species of bacteria, 2 species of mold and 1 species of yeast was determined.

Petri plates containing nutrient agar and various concentrations of MBP were inoculated with each of the test species. The identification of these organisms and the effective concentration of MBP inhibiting growth are shown in Table VII.

Example 18 — Apple Scab (*Venturia aequalis*) Control with Methylene Bispropionate Two mature MacIntosh trees were used for treatment. The trees were in the petal-fall stage (95–100 percent) and some fruit had set. The trees had not been sprayed during the season for control of insects or diseases. Distinct sporulating apple-scab lesions had developed on most of the foliage. Each tree was sprayed with 20 ml of methylene bispropionate and 2.5 ml of a nonionic surfactant in one liter of water in an 8 foot area on the lower branches of the trees. The results of the treatment are tabulated in Table VIII.

Example 19 — Apple Fire Blight Control

Nutrient agar plates were treated with aqueous methylene bispropionate. The plates were then inoculated with fire blight bacteria (*Erwinia amylovora*) and incubated for 48 hours. Streptomycin sulfate, the standard commercial antibiotic used for the control of fire blight on apples and pears, was also tested as a control standard. The results are tabulated in Table IX.

TABLE I-continued

| R | R¹ | R² | n |
|---|---|---|---|
| Isobutyl | H | Isobutyl | 1 or 2 |
| Methyl | Methyl | Methyl | 1 |
| Ethyl | Methyl | Ethyl | 1 |
| Propyl | Trichloromethyl | Propyl | 1 |
| Isopropyl | Methyl | Isopropyl | 1 |
| Methyl | 1,1,2,2-Tetrachloroethyl | Methyl | 1 |
| Methyl | o-Tolyl | Hexyl | 1 |
| Hexyl | Allyl | Hexyl | 1 |
| Allyl | H | Allyl | 1 or 2 |

TABLE II

| Compound | Rate, Oz/Bu | Weeks Effective | Corrosion 42 Days | Corrosion 83 Days |
|---|---|---|---|---|
| Propionic acid | 2 | 6 | 0 | — |
|  | 3 | 6 | 0 | — |
|  | 4 | 12+ | 0 | 1 |
|  | 6 | 12+ | 2 | 3 |
| Methylene bispropionate | 3 | 12+ | — | — |
|  | 6 | 12+ | — | — |
| Oxybismethylene propionate | 2 | 6 | 0 | — |
|  | 3 | 12 | 0 | 0.5 |
|  | 4 | 12+ | 0.5 | 0.5 |
|  | 5 | 12+ | 1 | 1 |
| Methylene bisacetate | 3 | 6 | — | — |
|  | 6 | 12+ | — | — |
| Oxybismethylene acetate | 3 | 5 | — | — |
|  | 6 | 12+ | — | — |

+Indicates treatment still effective and not broken at time indicated

TABLE III

| Propionic Acid to Formaldehyde in Mixture | Dosage Level, Oz Active/Bu | Weeks Control | Control* Index | Growth Rating at Break or Last Reading |
|---|---|---|---|---|
| 4:1 | 2.0 | 2.0 | 0.5 | 4.0 |
| 4:1 | 4.0 | 11.2 | 2.8 | 2.0 |
| 4:1 | 6.0 | 11.2+ | 2.8+ | 1 |
| 4:1 | 8.0 | 11.2+ | 2.8+ | 1 |
| 2:1 | 2.0 | 2.0 | 0.5 | 7.0 |
| 2:1 | 4.0 | 1 test = 3 / 2 tests = 10 | 0.75 / 2.5 | 2.0 |
| 2:1 | 6.0 | 11.2+ | 2.8+ | 1 |
| 2:1 | 8.0 | 11.2+ | 2.8+ | 1 |
| Formaldehyde | 2.67 | 2.0 | 0.5 | 3.0 |
| Propionic acid | 4 | 11.2 | 2.8 | 2.0 |
| Propionic acid | 6 | 11.2 | 2.8 | 2.0 |
| Propionic acid | 8 | 11.2+ | 2.8+ | 1.0 |

+indicates treatment still effective and not broken at time indicated

*Control Index = $\dfrac{\text{No. weeks control}}{\text{No. weeks control with known fungicide**}}$

**sodium N-methyldithiocarbamate

TABLE I

| R | R¹ | R² | n |
|---|---|---|---|
| Methyl | H | Methyl | 1, 2 or 3 |
| Methyl | H | Ethyl | 1 |
| Methyl | H | Propyl | 2 |
| Ethyl | H | Ethyl | 3 |
| Propyl | H | Allyl | 1, 2 or 3 |
| Isopropyl | H | Isopropyl | 1, 2 or 3 |
| n-Butyl | H | n-Butyl | 1, 2 or 3 |

TABLE IV

| Crop | % Wt MBP | Fungal Rating (Days) 2 | 7–8 | 28–29 |
|---|---|---|---|---|
| Wood Chips (freshly cut) | 1.4 | 0 | 0 | 0 |
|  | 0 | 6 | 8 | — |
| Sorghum (33% H₂O) | 0.51 | 0 | 0 | 0 |
|  | 0 | 8 | 10 | — |
| Wheat (26% H₂O) | 0.6 | 0 | 0 | 0 |
|  | 0 | 0.5 | 3 | — |
| Hay (4" seedlings) | 2.4 | 0 | 0 | 4 |
|  | 0 | 2 | 10 | — |
| Soybeans (26% H₂O) | 0.51 | 0 | 0 | 0 |

TABLE IV-continued

| Crop | % Wt MBP | Fungal Rating (Days) 2 | 7-8 | 28-29 |
|---|---|---|---|---|
| | 0 | 0 | 10 | — |

TABLE V

| Compound | Conc. Oz./100 Lbs. | Average Mycelial Growth (mm) Rhizopus | Penicillium | Fusarium | % Control All Species |
|---|---|---|---|---|---|
| Ethylidene Bispropionate | 16 | 2.3 | 1.05 | 0 | 91 |
| | 6.4 | 6.7 | 5.4 | 1.4 | 63 |
| | 2.5 | 11.4 | 5.6 | 1.2 | 50 |
| | 1.0 | 11.5 | 5.7 | 3.0 | 44 |
| Methylene Bisisobutyrate | 16 | 0 | 0.6 | 0 | 98 |
| | 6.4 | 0 | 0 | 0 | 100 |
| | 2.5 | 0.35 | 0 | 0 | 99 |
| | 1.0 | 0.32 | 0.3 | 0 | 98 |
| Oxybismethylene Bisisobutyrate | 16 | 0 | 0 | 0 | 100 |
| | 6.4 | 0 | 0 | 0 | 100 |
| | 2.5 | 0 | 4.8 | 0 | 87 |
| | 1.0 | 0 | 9.7 | 0 | 73 |
| Benzylidene Bispropionate | 16 | 0.6 | 2.8 | 0 | 91 |
| | 6.4 | 4.4 | 2.7 | 0.6 | 79 |
| | 2.5 | 14.3 | 2.3 | 0 | 54 |
| | 1.0 | 15.9 | 3.9 | 0 | 46 |
| Methylene Bisbutyrate | 16 | 0 | 0 | 0 | 100 |
| | 6.4 | 0 | 0 | 0 | 100 |
| | 2.5 | 0 | 0 | 0 | 100 |
| | 1.0 | 0 | 2.4 | 0 | 93 |
| Oxybismethylene Bisbutyrate | 16 | 0 | 0 | 0 | 100 |
| | 6.4 | 0 | 0 | 0 | 100 |
| | 2.5 | 0 | 0 | 0 | 100 |
| | 1.0 | 0 | 0 | 0 | 100 |
| 2,2,2-Trichloroethylidene Bispropionate | 16 | 1.3 | 2.6 | 0 | 39 |
| | 6.4 | 5.2 | 4.1 | 0 | 74 |
| | 2.5 | 5.3 | 4.5 | 7 | 54 |
| | 1.0 | 19.3 | 4.4 | 9.5 | 8 |
| Methylene Bispropionate | 16 | 0 | 0 | 0 | 100 |
| | 6.4 | 0 | 0 | 0 | 100 |
| | 2.5 | 0 | 0 | 0 | 100 |
| | 1.0 | 0 | 0.32 | 0.9 | 97 |
| Ethylidene Bisacetate | 16 | 0 | 0 | 0 | 100 |
| | 6.4 | 2.6 | 0 | 0 | 93 |
| | 2.5 | 4.3 | 0 | 0.5 | 87 |
| | 1.0 | 10.0 | 2.1 | 2.3 | 60 |
| Propionic Acid | 16 | 0 | 0.42 | 0 | 99 |
| | 6.4 | 0.4 | 0 | 0 | 99 |
| | 2.5 | 3.4 | 1.9 | 9.1 | 60 |
| | 1.0 | 11.1 | 3.8 | 11.2 | 28 |
| Control | 0 | 19.6 | 4.7 | 12.1 | — |

TABLE VI

| Compound | Concentration (oz/100 lbs) for 90% Control Rizopus sp. | Fusarium sp. | Aspergillus niger |
|---|---|---|---|
| Propionic acid | 3.8 | 9.6 | 3.4 |
| Methylene bisisobutyrate | 3.2 | 2.0 | * |
| Oxybismethylene bisisobutyrate | 1.2 | 0.88 | 2.1 |
| Methylene bisbutyrate | 1.3 | 0.83 | 0.88 |
| Oxybismethylene bisbutyrate | 1.1 | 1.0 | 0.57 |
| Methylene bispropionate | 0.85 | 0.5 | 0.16** |

*No control at 2.5 oz/100 lbs.
**0.16 oz/100 lbs gave 99% control

TABLE VII

| Organism | Germistatic Concentration of MPB (ppm) |
|---|---|
| Candida albicans | 1000 |
| Staphylococcus aureus | 1000 |
| Escherichia coli | 6000 |
| Streptococcus pyrogenes | 700 |
| Aspergillus niger | 800 |
| Trichophyton interdigitale | 800 |
| Pseudomonas aeruginosa | 7000 |
| Bacillus subtilis | 8000 |

TABLE VIII

| Treatment | Foliage Phytotoxicity | Apple Scab Eradication Hours after Treatment | |
|---|---|---|---|
| | | 24 | 48 |
| Methylene bispropionate | 0 | 40% | 100% |
| Untreated check | 0 | 0 | 0 |

TABLE IX

| Formulation & Concentration | pH | Bacteria Growth |
|---|---|---|
| None | 6.8 | + |
| 10 ppm Streptomycin sulfate | 6.8 | − |
| 0.1% Methylene bispropionate | 6.0 | − |
| 0.1% Methylene bispropionate | 6.8 | − |
| 1.0% Methylene bispropionate | 5.5 | − |
| 1.0% Methylene bispropionate | 6.8 | − |

What is claimed is:

1. A method for controlling the growth of fungi which comprises applying to said fungi or their habitat a fungicidally effective amount of a di-ester of the formula

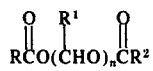

wherein R is alkyl of 1 to 6 carbon atoms or alkenyl of 2 to 6 carbon atoms, $R^2$ is alkyl of 1 to 6 carbon atoms or alkenyl of 2 to 6 carbon atoms, $R^1$ is hydrogen, alkyl of 1 to 6 carbon atoms, chloroalkyl of 1 to 4 carbon atoms and 1 to 5 chloro groups, alkenyl of 2 to 6 carbon atoms, phenyl, or alkphenyl of 7 to 10 carbon atoms, and $n$ is 1, 2 or 3.

2. The method of claim 1 wherein $R^1$ is alkenyl of 2 to 6 carbon atoms.

3. The method of claim 2 wherein the di-ester is allylidene bispropionate.

4. The method of claim 1 wherein $R^1$ is chloroalkyl.

5. The method of claim 1 wherein the di-ester is 2,2,2-trichloroethylidene bispropionate.

6. The method of claim 1 wherein $R^1$ is phenyl or alkphenyl of 7 to 10 carbon atoms.

7. The method of claim 6 wherein the di-ester is benzylidene bispropionate.

8. A method of controlling the growth of fungi which comprises applying to said fungi or their habitat a fungicidally effective amount of a di-ester of the formula

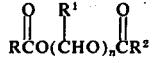

wherein R is alkyl of 1 to 6 carbon atoms, $R^2$ is alkyl of 1 to 6 carbon atoms, $R^1$ is hydrogen or alkyl of 1 to 6 carbon atoms and $n$ is 1, 2 or 3.

9. The method of claim 8 wherein $R^1$ is hydrogen and $n$ is 1 or 2.

10. The method of claim 9 wherein R and $R^2$ are methyl.

11. The method of claim 9 wherein R and $R^2$ are ethyl.

12. The method of claim 9 wherein R and $R^2$ are n-propyl.

13. The method of claim 8 wherein R and $R^2$ are isopropyl.

14. The method of claim 8 wherein $R^1$ is alkyl of 1 to 3 carbon atoms and $n$ is 1.

15. The method of claim 14 wherein $R^1$ is methyl.

16. The method of claim 15 wherein R and $R^2$ are methyl.

17. The method of claim 8 wherein the fungal habitat is a vegetative product or animal feedstuff.

18. The method of claim 17 wherein the vegetative products are forage crops or seeds.

19. The method of claim 18 wherein the seed is a cereal grain or a nut seed.

20. The method of claim 18 wherein the crop is peanuts.

21. The method of claim 18 wherein the crop is wood chips, hay, corn, soybeans or sorghum.

22. The method of claim 18 wherein $R^1$ is hydrogen, R and $R^2$ are the same alkyl, and $n$ is 1 or 2.

23. The method of claim 22 wherein the di-ester is methylene bispropionate.

24. The method of claim 8 wherein the di-ester is formulated with a biologically inert carrier.

25. The method of claim 8 wherein an aqueous solution of the di-ester is employed.

26. A method for the control of *Venturia inaequalis* fungus which comprises applying to said fungus or its habitat a fungicidally effective amount of the compound defined in claim 8.

27. The method of claim 26 wherein $R^1$ is hydrogen, R and $R^2$ are the same alkyl and $n$ is 1 or 2.

28. The method of claim 27 wherein the di-ester is methylene bispropionate.

29. A method for the control of bacteria which comprises applying to said bacteria or their habitat a bactericidally effective amount of the di-ester of claim 8.

* * * * *